US008021542B2

(12) United States Patent
Kirts

(10) Patent No.: US 8,021,542 B2
(45) Date of Patent: Sep. 20, 2011

(54) METHOD FOR RECOVERING POTABLE WATER FROM THE EXHAUST OF AN INTERNAL COMBUSTION ENGINE

(75) Inventor: Richard Eugene Kirts, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 955 days.

(21) Appl. No.: 11/865,993

(22) Filed: Oct. 2, 2007

(65) Prior Publication Data

US 2009/0084728 A1 Apr. 2, 2009

(51) Int. Cl.
*B01D 17/12* (2006.01)
*B01D 19/00* (2006.01)
*C02F 1/02* (2006.01)

(52) U.S. Cl. ............... 210/96.2; 34/80; 96/156; 96/188; 96/189; 96/219; 96/235; 96/240; 210/130; 210/136; 210/180; 210/182; 210/202; 210/257.2; 210/258; 210/259

(58) Field of Classification Search .................. 210/96.1, 210/96.2, 130, 143, 180, 182, 188, 195.2, 210/199, 202, 203, 257.2, 258, 259, 652, 210/669, 806, 136, 321.6; 96/150, 155, 156, 96/188, 189, 195, 196, 219, 234, 235, 240, 96/244; 95/156, 185, 186, 206, 240, 241, 95/260, 291; 34/80; 60/272
See application file for complete search history.

(56) References Cited

U.S. PATENT DOCUMENTS

| | | | |
|---|---|---|---|
| 3,074,391 A * | 1/1963 | Bloch | 123/1 R |
| 3,321,191 A * | 5/1967 | Najarian | 261/29 |
| 4,656,831 A * | 4/1987 | Budininkas et al. | 60/297 |
| 4,725,359 A * | 2/1988 | Ray | 210/640 |
| 6,581,375 B2 * | 6/2003 | Jagtoyen et al. | 60/309 |
| 7,000,409 B2 * | 2/2006 | Mazzetti | 62/93 |
| 7,389,639 B2 * | 6/2008 | Michalakos et al. | 60/309 |
| 7,537,702 B2 * | 5/2009 | Lupton et al. | 210/652 |
| 2004/0094036 A1* | 5/2004 | Nichols et al. | 95/148 |
| 2007/0028769 A1* | 2/2007 | Eplee et al. | 95/113 |
| 2007/0101862 A1* | 5/2007 | Tongue | 95/231 |
| 2007/0157816 A1* | 7/2007 | Tao et al. | 96/108 |
| 2007/0175333 A1* | 8/2007 | Shoemaker et al. | 96/243 |
| 2009/0211276 A1* | 8/2009 | Forkosh | 62/94 |

* cited by examiner

*Primary Examiner* — Joseph W Drodge

(74) *Attorney, Agent, or Firm* — Christopher L. Blackburn; David S. Kalmbaugh

(57) ABSTRACT

A water recovery method and apparatus which uses a desiccant, such as lithium chloride, to recover water vapor from the engine exhaust of a vehicle. The apparatus uses liquid-contactor to transfer water vapor from the vehicle exhaust to the liquid desiccant. The desiccant is then transferred to a reverse osmosis system which separates the liquid desiccant into potable water and a concentrated desiccant.

6 Claims, 5 Drawing Sheets

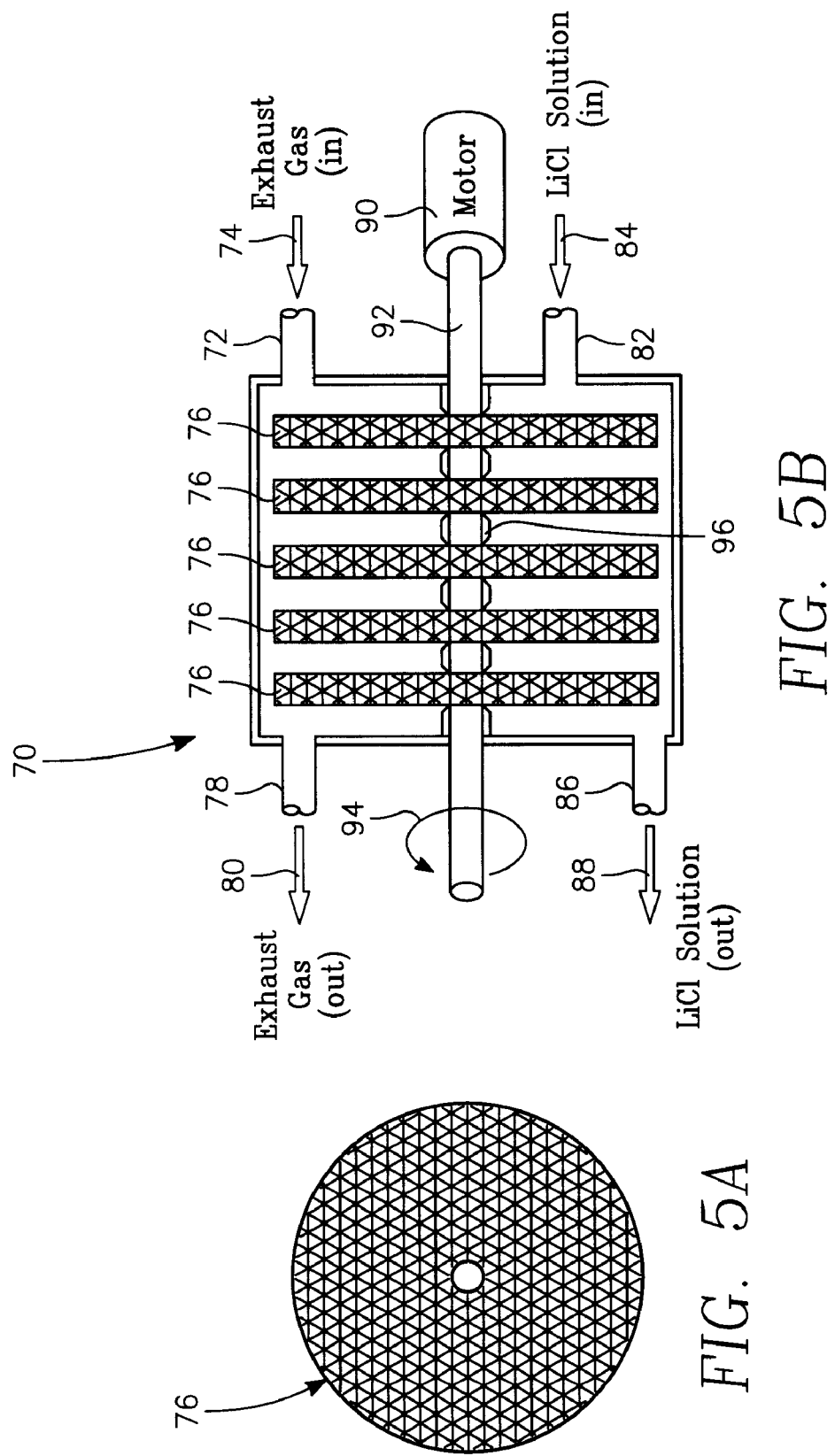

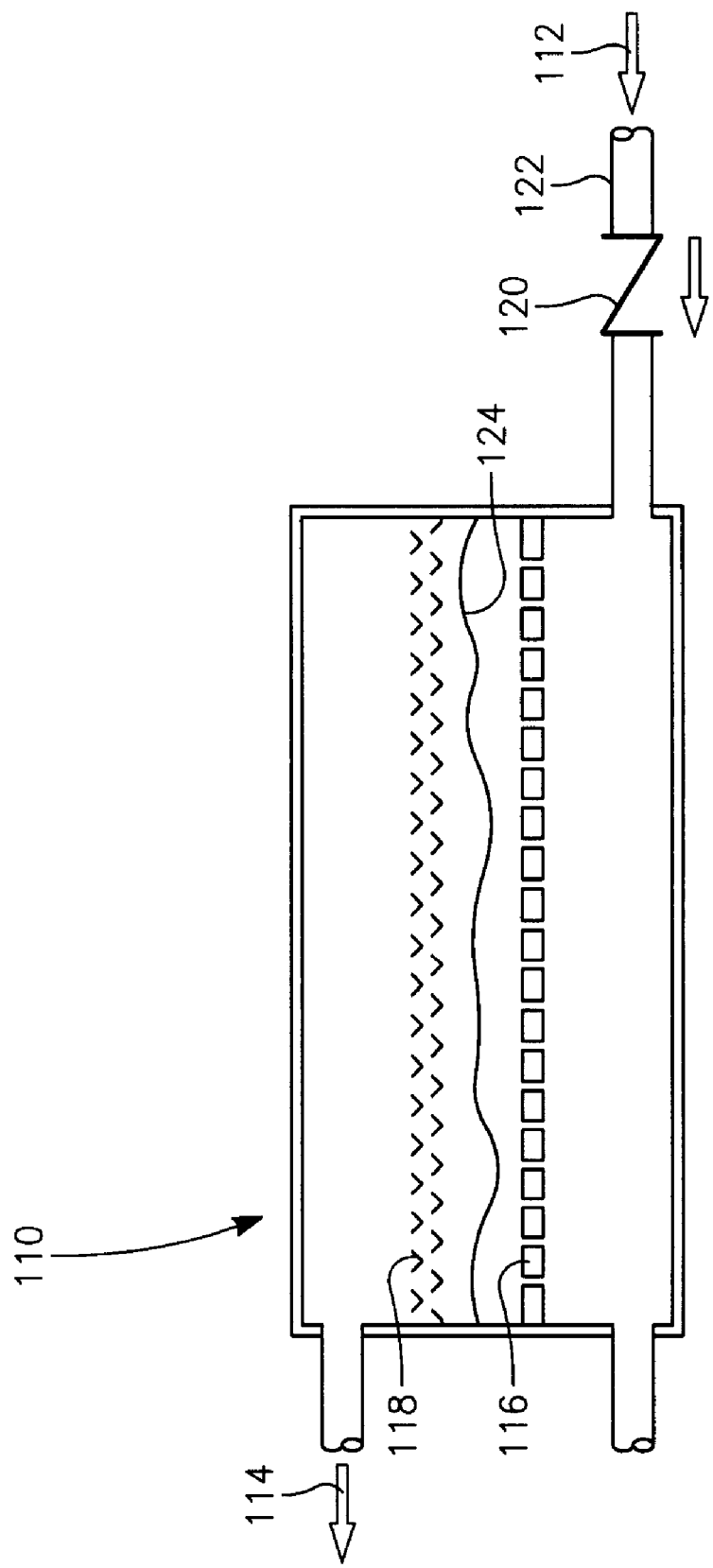

METHOD FOR RECOVERING POTABLE WATER FROM THE EXHAUST OF AN INTERNAL COMBUSTION ENGINE

BACKGROUND OF THE INVENTION

1. Field of the Invention

The present invention relates generally to a method for recovering potable water which is safe for drinking from the exhaust of an internal combustion engine. More particularly, the present invention relates to a method which uses a liquid desiccant to extract from the exhaust of an internal combustion engine and then provides the desiccant to a reverse osmosis unit to extract potable water from the desiccant.

2. Description of the Prior Art

Supplying potable water to military personnel on remote missions (especially in hot, dry, desert-like conditions) is a very difficult logistical problem. Unlike fuel or ammunition, water is continuously consumed by military personnel and water cannot be made lighter or less bulky.

The average daily consumption of drinking water for a Marine or soldier on is about 16 liters per person. A platoon of forty four servicemen will consume over 170 gallons of purified water a day. The weight of 170 gallons is approximately 1400 pounds. It is often very difficult to supply the replacement for this amount of water.

For troops which use motorized vehicles (such as the high mobility multipurpose wheeled vehicle (HMMWV)), the water generated by the combustion of fuel can provide all or part of a serviceman's daily requirement of drinking water. A typical internal combustion engine produces a gallon of water for gallon of fuel the engine burns.

The United States Army developed a Water Recovery Utilizing Exhaust (WRUE) system which uses refrigeration coils to condense the water in engine exhaust. The WRUE system requires a mechanical refrigeration unit for the cooling cools and a series of filters and other water treatment steps to remove particulates and organic materials from the condensate. An engine powered compressor pressurizes a gaseous refrigerant. The pressurized refrigerant gas enters a heat exchanger/condenser where the gas is condensed to a liquid state. The liquid then passes through an expansion device and enters an evaporator. In the evaporator, the evaporating refrigerant absorbs heat from the engine exhaust gases changing the liquid refrigerant back to a gas. The evaporating liquid cools the engine exhaust to a temperature below the dew point of water. The condensed water is collected in a pan at the bottom of the evaporator. The liquid water from the evaporator is periodically pumped through a particle filter to remove soot and other particles, then through an activated carbon filter to remove any unburned hydrocarbons. A disinfectant, such as hypochlorite, is added to the water to make the water safe to drink. The WRUE system is mechanically complex, expensive, and uses a significant amount in the cargo area of a HMMWV. The power required to run the compressor can also significantly reduce the fuel economy in the vehicle.

SUMMARY OF THE INVENTION

The present invention overcomes some of the difficulties of the past including those discussed above, in that it comprises a relatively simple in design, yet highly efficient and effective water recovery method and apparatus. The apparatus uses a liquid desiccant, such as a solution of lithium chloride, to absorb water vapor from the engine exhaust of a vehicle. The apparatus uses a liquid-gas contactor to transfer water vapor from the vehicle exhaust to the liquid desiccant. The desiccant is then supplied to a reverse osmosis system which separates the liquid desiccant into potable water and a concentrated desiccant.

The desiccant which enters the reverse osmosis unit has a concentration of approximately two percent lithium chloride solution, while the desiccant exiting the reverse osmosis unit has a concentration of approximately four percent lithium chloride solution. This allows the use of a small reverse osmosis unit designed to run on an electrical system.

The four percent lithium chloride solution is pumped back to the liquid gas contactor to re-spray the contactor with the lithium chloride solution completing the cycle.

Potable water is transferred to a storage tank from the reverse osmosis unit.

BRIEF DESCRIPTION OF THE DRAWINGS

FIG. 5 illustrates a second embodiment of the contactor used in the water recovery apparatus of FIG. 2; and FIG. 6 illustrates a third embodiment of the contactor used in the water recovery apparatus of FIG. 2

DETAILED DESCRIPTION OF A PREFERRED EMBODIMENT

Figure 1:
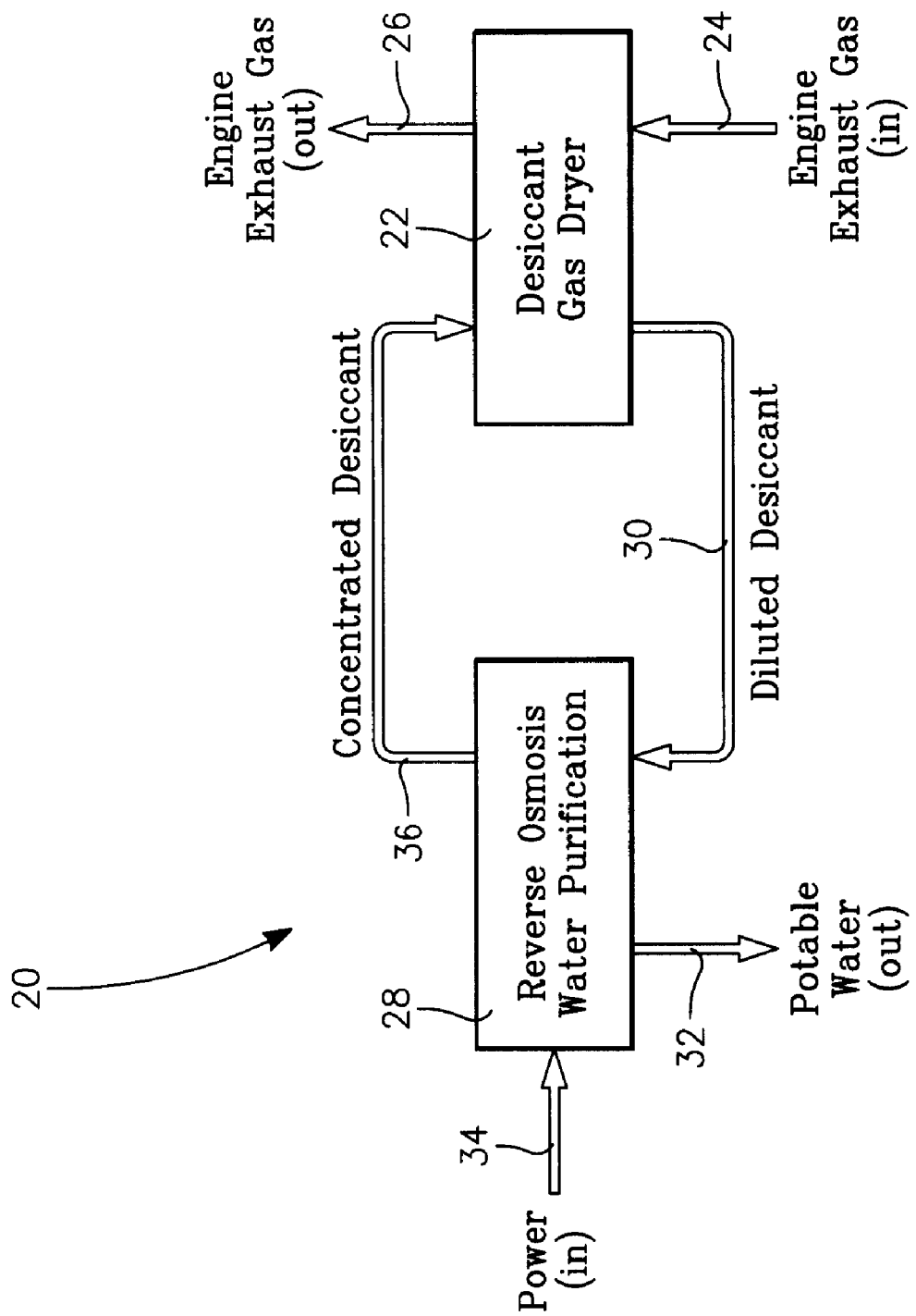
FIG. 1 is a simplified block diagram illustrating a method and apparatus which uses a desiccant for extracting water from the exhaust of an external combustion engine.

Referring to FIG. 1, there is shown a simplified block diagram of a water recovery apparatus, designated generally by the reference numeral 20, which uses a desiccant to recover water from the exhaust of military vehicle such as a HMMWV or truck.

Exhaust from the internal combustion engine enters a desiccant gas dryer 22 as is best indicated by gas flow path 24 Engine exhaust is emitted from gas dryer 22 into the atmosphere in the manner indicted by gas flow path 26.

The gas dryer 22 includes a liquid-gas contactor 46 (FIG. 2) or similar device which is used to facilitate the transfer of water vapor from the vehicle's exhaust to a liquid desiccant. The diluted desiccant flows from the gas dryer 22 to a reverse osmosis water purification device 28 in the manner indicted by exhaust flow path 30. The reverses osmosis water purification device 28 separates the liquid desiccant into potable water and concentrated desiccant. Potable water exits from reverse osmosis water purification device 28 (indicated by liquid flow path 32), while power to run the reverse osmosis water purification device 28 is supplied by the vehicle's electrical power system (indicted by power flow path 34). The concentrated desiccant is pumped back to the contactor 46 (FIG. 2) to complete the process cycle. The water is treated with a disinfectant (such as ozone) and pumped to a potable water storage tank.

Figure 2:
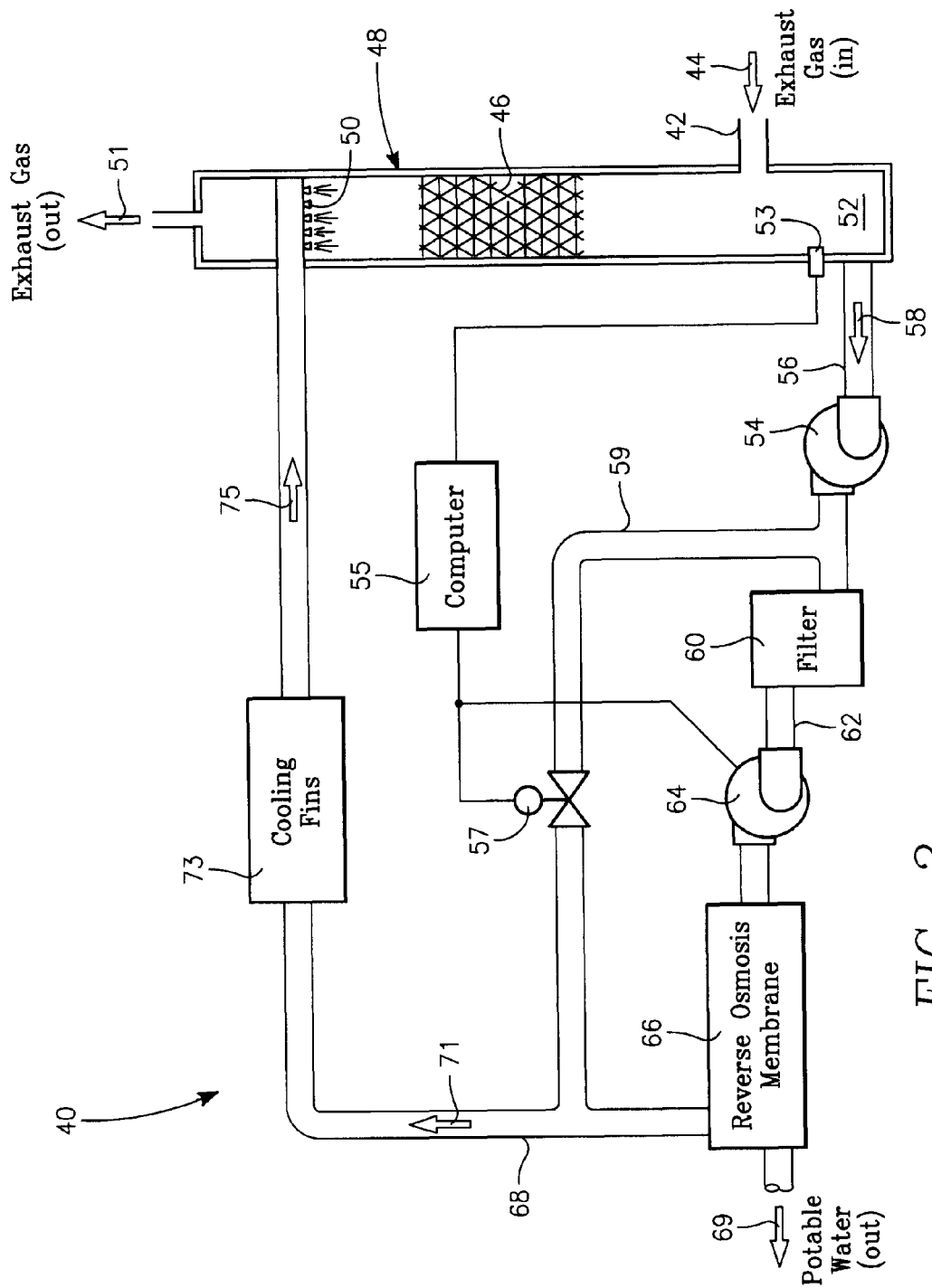
FIG. 2 is a schematic diagram of a water recovery apparatus which uses a desiccant for extracting water from the exhaust of an external combustion engine.

Referring to FIG. 2, exhaust from the engine of a vehicle enters the water recovery apparatus, designated generally by the reference numeral 40, through an exhaust gas inlet port 42 in the manner indicated by gas flow path 44. A liquid-gas contactor 46 within desiccant gas dryer 48 receives the vehicle exhaust from the vehicle through inlet port 42.

Exhaust exits the desiccant gas dryer 48 via an exhaust port in the manner indicated by arrow 51.

The gas dryer 48 extracts the water from the vehicle exhaust using a liquid desiccant. A desiccant removes water from an air stream when the water vapor pressure at the surface of the desiccant is lower than the water vapor pressure of the surrounding air. If the desiccant has a lower vapor pressure than water, air passing over the desiccant solution losses moisture to the desiccant.

While any commercial available desiccant solution will work effectively in the preferred embodiment of the invention, the desiccant used in the water recovery apparatus 40 illustrated in FIG. 2 is a solution of lithium chloride. A plurality of spray nozzles 50 positioned downstream from liquid-gas contactor 46 spray lithium chloride solution in a liquid form into the interior of liquid-gas contactor 46. The liquid-gas contactor 46 facilitates the transfer of water vapor from engine exhaust 42 to the lithium chloride solution provided by spray nozzles 50.

In this process, water content of the exhaust decreases while the water content of the lithium chloride solution increases or the lithium chloride solution becomes more dilute.

Figure 3:
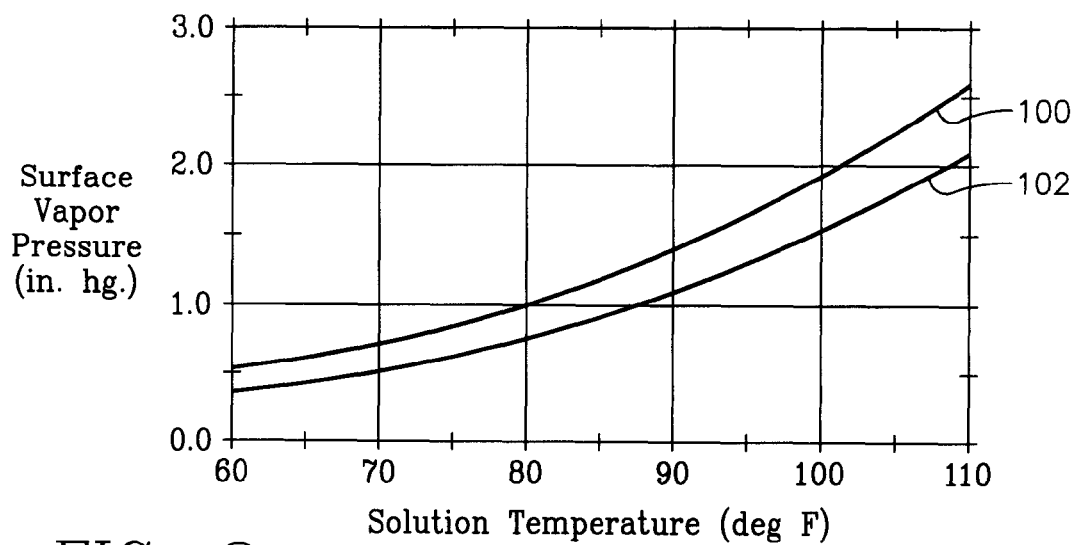
FIG. 3 illustrates vapor pressure-temperature plots for various lithium chloride solution concentrations.

Referring to FIG. 3, the vapor pressure of a liquid desiccant solution is directly related to its temperature and inversely proportional to its concentration. FIG. 3 illustrates the effect of increasing lithium chloride concentration on the water vapor pressure at the surface of a droplet. Plot 100 illustrates surface vapor pressure versus solution temperature for pure water. Plot 102 illustrates surface vapor pressure versus solution temperature for a 15% concentration of lithium chloride. The surface vapor pressure for 2% and 4% concentrations of lithium chloride will be between Plot 100 and Plot 102.

Figure 4:
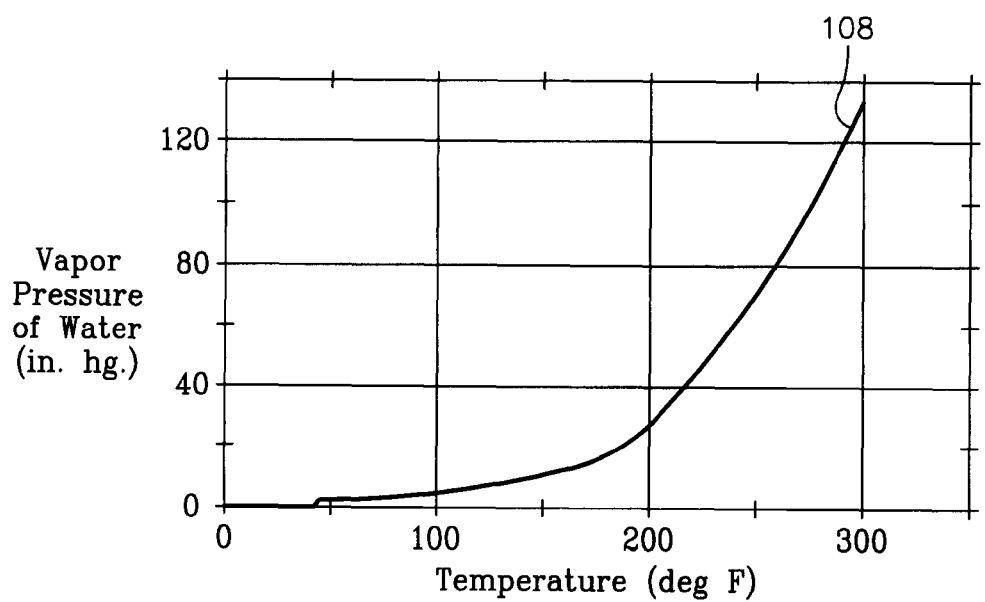
FIG. 4 illustrates a vapor pressure-temperature plot for water at temperatures typical of engine exhaust gases.

Referring to FIG. 4, FIG. 4 illustrates a plot 108 for the vapor pressure of water at elevated temperatures normally associated with engine exhaust. The difference in vapor pressure, even for weak solutions of lithium chloride, will be in excess of 100 inches of mercury pressure. This high pressure translates into a relatively small gas contactor. Heat transfer fins 73 (FIG. 2) on the lithium chloride discharge line from the reverse osmosis unit assist in cooling the concentrated lithium chloride solution. Cooling the solution lowers its vapor pressure which increases the driving potential for water removal.

In the preferred embodiment, removal of moisture is accomplished by reverse osmosis. Normally, the release of moisture from a desiccant is accomplished by heating the desiccant solution. In the preferred embodiment, the diluted lithium chloride solution is filtered to remove large particles and then passed through a reverse osmosis unit that separates the lithium chloride solution into potable water and a more concentrated lithium chloride. The concentrated lithium chloride is 4% lithium chloride. The concentration level for the lithium chloride solution entering the reverse osmosis unit is approximately 2%.

Referring to FIG. 2, the diluted lithium chloride solution (which includes water vapor removed from the engine exhaust) flows from the contactor 46 to sump 52. A low pressure pump 54 transfers the diluted lithium chloride solution from the sump 52 through a sump transfer line 56 to a filter 60. Filter 58 removes large particles of soot and other contaminants from the lithium chloride solution.

Reverse osmosis system 66 operates using mechanically applied pressure to overcome the osmotic pressure of a solution. Osmotic pressure is given by the Van't Hoff's equation:

$$P_{osmotic} = i * M * R * T$$

where:
$i$=Van't Hoff's factor=1.8 for simple salt solutions
$M$=molarity
$R$=universal gas constant=0.082 atm-liter/gram mole/deg K
$T$=temperature, degree Kelvin The pressure required to separate potable water from a salt-type solution, including a lithium chloride solution, is directly dependent on temperature. It is important that the lithium chloride solution be as cool as possible. A two percent solution (molarity=0.47) of lithium chloride has an osmosis pressure of 317 psi at forty degrees Centigrade. These conditions of concentration and temperature result in an osmotic pressure approximately that of seawater. Most reverse osmosis units are designed to extract potable water from seawater.

Referring to FIG. 2, the reverse osmosis unit consist of a pump module 64 and a membrane module 66. The components of the reverse osmosis unit need not be co-located. This allows the reverse osmosis system to positioned within the vehicle anywhere space is available.

The concentration of lithium chloride withdrawn from the sump 52 by pump 54 is approximately two percent in the preferred embodiment. A conductivity sensor 53 located within the brine sump 52 measures the concentration of the lithium chloride. When the concentration of lithium chloride is greater than two percent, a signal is sent to a computer 55 or other activation device which opens a normally closed bypass valve 57. The bypass valve 57 when opened diverts the desiccant flow through a bypass line 59 around reverse osmosis system 66 until the concentration of lithium chloride is reduced to less than two percent.

When the bypass valve 57 is open, high pressure pump 64 is deactivated by computer 55. This prevents desiccant flow to reverse osmosis system 66. When the bypass valve 57 is closed computer 55 activates pump 64 which result in desiccant flow through filter 60, and desiccant flow line 62 to the reverse osmosis membrane 66.

The reverse osmosis system 66 operates at a fifty percent recovery rate of potable water. The concentration of lithium chloride solution exiting reverse osmosis system 66 therefore doubles to approximately four percent. The discharge pressure for the lithium chloride solution exiting the reverse osmosis system 66 via discharge line 68 is approximately 634 psi. The Potable water exits the reverse osmosis system 66 in the manner indicated by arrow 69 to a potable water storage tank located on board the vehicle. The potable water is disinfected by the addition of ozone or chlorine (not illustrated) then stored in the storage tank for later use.

A four percent lithium chloride solution is discharged from the reverse osmosis system 66 through a discharge line 68 to a heat exchanger having a plurality of fins 73 with the direction of fluid flow being indicated by arrow 71. The fins 73, which operate as heat transfer fins, assist in the cooling of the lithium chloride solution. The four percent lithium chloride solution is then transferred from the heat exchanger to the spray nozzles 50 with the direction of fluid flow being indicated by arrow 75.

An example of calculated system performance under specific operating conditions for the water recovery apparatus 40 illustrated in FIG. 2 is set forth as follows. The engine used to drive the HMMWV vehicle is an eight cylinder, naturally aspirated, four cycle diesel engine with a displacement of 6468 cubic centimeters. When the engine speed is 3000 RPM, the air fuel ratio is 15:1 and the outdoor air conditions are 70° F. @ 90% rh, air is pumped through the engine at 340 ft$^3$/min as seen from the following expression:

$$3000 \text{ rev/min} * 6468 \text{ cc}/2 \text{ rev} * 1 \text{ ft}^3/28320 \text{ cc } 340 \text{ ft}^3/\text{min}$$

The air density at the engine inlet is about 0.07 pounds per cubic foot. Thus, approximately 24 pounds of dry air passes through the engine each minute. The moisture content of the engine inlet air is 0.0077 ponds of water per pound of dry air. Therefore, 0.2 pounds of atmospheric moisture also passes through the engine each minute.

Diesel fuel has an average composition of $C_{12}H_{26}$. Therefore, $$2C_{12}H_{26} + 37\,O_2 \rightarrow 24\,CO_2 + 26\,H_2O.$$

Accordingly, 340 lbs of fuel combines with 1184 lbs of oxygen to form 1056 lbs of carbon dioxide and 468 pound of water. The combustion of one pound of diesel fuel results in the generation of approximately 1.38 pounds of water. Losses would generally reduce the amount of water formed to about 1.2 pounds of water per pound of fuel burned. Thus, 24 lbm air/min*1 lbm fuel/15 lbm air*1.2 lbm combustion water/lbm fuel=1.92 lbm combustion water/min.

which results in, 1.92 lbm combustion water/min+0.2 lbm atmospheric water/min=2.12 lbm water/min.

This results in a maximum recovery of about two pound of water per minute or about 11 gallons of water per hour from HMMWV engine exhaust at the stated operating conditions.

The nominal daily potable water requirement for a serviceman in a hot dry climate is at least four gallons or thirty two pounds of water. Sufficient water for a squad of thirteen servicemen is generally produced in about four and a half hours when the HMMWV engine is operated under normal conditions as set forth in the previous discussion. The reverse osmosis system 66 of water recovery apparatus 40 is designed to purify water at the rate it is produced by the engine exhaust which is about 2 lb/min. This also takes in to account a 50% rejection rate, since about 4 lb/min or ½ gallon per minute of water flows through water recovery apparatus 40. Contactor 46 is configured to reduce the concentration of lithium chloride from four percent to two percent in one pass through the contactor 46.

At less then design operating conditions, the concentration of lithium chloride is not reduced to two percent in one pass through the contactor 46. There are two procedures for controlling the operation of water recovery apparatus 40 at less than design load. First, the user can reduce the desiccant circulation rate so that the lithium chloride solution in the sump 52 as monitored by conductivity sensor 53 is always 2%. Second, the user can keep the desiccant circulation rate constant and bypass the reverse osmosis system 66 until the concentration of lithium chloride in the sump 52 drops slightly below 2%.

The first control option (reduce the desiccant circulation rate) requires the use of a variable speed high pressure pump which would require computer 55 to control the speed of pump 64 depending upon the percentage of lithium chloride solution sensed in the brine sump 52 by conductivity sensor 53.

The second control option (reverse osmosis system bypass) requires bypass valve 57 to divert the desiccant flow around the reverse osmosis system 66 until the concentration of lithium chloride is reduced to less than 2%. This concentration control option requires the use of conductivity sensor 53 located in the sump 52 to measure the concentration of the lithium chloride in the sump. The computer 55, in response to the lithium chloride solution measurements obtained by sensor 53, can open and close valve 57 as required.

At HMMWV engine operating conditions above the design point, all of the water in the engine exhaust stream is not captured. The excess water is discharge form the vehicle's tail pipe.

Referring to FIGS. 5A and 5B, therein is shown an alternative embodiment for the gas desiccant contactor, which is designated generally by the reference numeral 70. Exhaust gas from the engine enters contactor 70 via a gas inlet port 72 in the manner indicated by arrow 74. The engine exhaust passes through a plurality of rotating stainless steel mesh pads 76 which are coated with the droplets of the desiccant lithium chloride solution for extracting water vapor from the engine exhaust. The engine exhaust exits the contactor 70 through gas exit port 78 in the manner indicated by arrow 80.

Lithium chloride solution enters the contactor 70 via a liquid inlet port 82 (indicated by arrow 84) and exits the contactor 70 via a liquid exit port 86 (indicated by arrow 88). A motor 90 and shaft 92 rotates (as indicated by arrow 94) each of stainless steel mesh pads 76. Lithium chloride solution entering contactor 70 via inlet port 82 adheres to each of the pads 76. The pads 76 then rotate so that the pads 76 which are coated with the droplets of lithium chloride solution are in the path of the engine exhaust. The desiccant covered pads 76 recover water vapor from the engine forming a diluted lithium chloride solution. The pads 76 are then rotated into the lithium chloride solution, lowering the concentration of the solution. The diluted lithium chloride solution exits at the exit port 86 of contactor 70.

Wiping seals 96 are included within contactor 70 to separate the gas and liquid flow streams.

Referring to FIG. 6, there is shown another embodiment for the gas desiccant contactor, which is a sparge box type contactor designated generally by the reference numeral 110. The engine exhaust enters contactor 110 via an inlet port (indicated by arrow 112) and exits the contactor 110 via an exit port (indicated by arrow 114). A check valve 120 is included in the exhaust inlet line 122 to prevent liquid from possibly flowing back into the engine. The desiccant is located within the bottom portion of the contactor 110 below the upper surface of the liquid desiccant 124 within contactor 110. Placement of the desiccant in the bottom portion of the contactor 110 allows the engine exhaust to bubble through the desiccant.

The upper surface of the liquid desiccant 124 is located above the perforated plate 116 and below the demisters 118. Engine exhaust gases are formed into small bubbles by the passage of gases through the perforated plate 116. The large surface area of these bubbles increases the rate of transfer of water vapor from the engine exhaust gas to the lithium chloride solution. The demisters 118 collect the droplets formed when the exhaust gas bubbles break the surface of the lithium chloride solution and coalesce these small droplets into large droplets that fall back into the lithium chloride solution. The demisters 118 reduce the amount of lithium chloride solution that is lost by transport with the exhaust gases out of the exit port which is indicted by arrow 114.

What is claimed is:

1. An apparatus for recovering potable water from engine exhaust of an internal combustion engine comprising:
   (a) a desiccant gas dryer having a contactor to receive said engine exhaust from said internal combustion engine, wherein said engine exhaust enters said contactor at a gas inlet port thereof and exits said contactor at a gas outlet port thereof;
   (b) a plurality of spray nozzles aligned with the gas outlet port of said contactor, said plurality of spray nozzles spraying a lithium chloride solution into an interior portion of said contactor, said contactor facilitating a transfer of water vapor from said engine exhaust passing through said contactor to said lithium chloride solution wherein said lithium chloride solution contains lithium chloride and said water vapor transferred from said engine exhaust;

(c) a sump aligned with the gas inlet port of said contactor to receive said lithium chloride solution containing said water vapor from said contactor;

(d) a conductivity sensor located within said sump, said conductivity sensor measuring a concentration of the lithium chloride within said sump, wherein the concentration of the lithium chloride within said sump measured by said conductivity sensor is normally at a first concentration level of approximately two percent;

(e) a first pump having an inlet port connected to said sump and a discharge port;

(f) a filter connected to the discharge port of said first pump to receive said lithium chloride solution from said sump when the lithium chloride within said sump is at said first concentration level, said filter removing contaminants from said lithium chloride solution;

(g) a reverse osmosis unit connected to said filter to receive said desiccant from said filter and remove said water vapor from said lithium chloride solution, said water vapor exiting said reverse osmosis unit as drinking water; and (h) said reverse osmosis unit being connected to said plurality of nozzles to transfer said lithium chloride solution exiting said reverse osmosis unit to said spray nozzles which then spray the lithium chloride solution into the interior of said contactor, wherein the concentration of the lithium chloride contained within the lithium chloride solution exiting said reverse osmosis unit is normally at a second concentration level of approximately four percent;

(i) a normally closed bypass valve having an inlet port connected to the discharge port of said first pump and an outlet port connected to said spray nozzles which opens when a concentration level of the lithium chloride in said sump is above said first concentration level allowing said lithium chloride solution to bypass said reverse osmosis unit and flow directly to said spray nozzles;

(j) a second pump having an inlet port connected to said filter and a discharge port connected to a reverse osmosis membrane within said reverse osmosis unit, said second pump being activated when the concentration of the lithium chloride within said sump is measured at said first concentration level, wherein activating said second pump transfers said lithium chloride solution from said sump through said filter to the reverse osmosis membrane within said reverse osmosis unit;

(k) a computer for opening said normally closed bypass valve and activating said second pump in response to measurements by said conductivity sensor of the concentration level of said lithium chloride within said sump.

2. An apparatus for recovering potable water from engine exhaust of an internal combustion engine comprising:

(a) a desiccant gas dryer having a contactor to receive said engine exhaust from said internal combustion engine, wherein said engine exhaust enters said contactor at a gas inlet port thereof and exits said contactor at a gas outlet port thereof;

(b) a plurality of spray nozzles aligned with the gas outlet port of said contactor, said plurality of spray nozzles spraying a lithium chloride solution into an interior portion of said contactor, said contactor facilitating a transfer of water vapor from said engine exhaust passing through said contactor to said lithium chloride solution wherein said lithium chloride solution contains lithium chloride and said water vapor transferred from said engine exhaust;

(c) a sump aligned with the gas inlet port of said contactor to receive said lithium chloride solution containing said water vapor from said contactor;

(d) a conductivity sensor located within said sump, said conductivity sensor measuring a concentration of the lithium chloride within said sump, wherein the concentration of the lithium chloride within said sump measured by said conductivity sensor is normally at a first concentration level of approximately two percent;

(e) a first pump having an inlet port connected to said sump and a discharge port;

(f) a filter connected to the discharge port of said first pump to receive said lithium chloride solution from said sump when the lithium chloride within said sump is at said first concentration level, said filter removing contaminants from said lithium chloride solution;

(g) a reverse osmosis unit connected to said filter to receive said desiccant from said filter and remove said water vapor from said lithium chloride solution, said water vapor exiting said reverse osmosis unit as drinking water; and (h) said reverse osmosis unit being connected to said plurality of nozzles to transfer said lithium chloride solution exiting said reverse osmosis unit to said spray nozzles which then spray the lithium chloride solution into the interior of said contactor, wherein the concentration of the lithium chloride contained within the lithium chloride solution exiting said reverse osmosis unit is normally at a second concentration level of approximately four percent;

(i) a plurality of cooling fins connected to said reverse osmosis unit to receive said lithium chloride solution from said reverse osmosis unit, said cooling fins transferring heat from said lithium chloride solution to cool said lithium chloride solution, said cooling fins being connected to said spray nozzles to transfer said lithium chloride solution to said spray nozzles.

3. An apparatus for recovering potable water from engine exhaust of an internal combustion engine comprising:

(a) a desiccant gas dryer having a contactor to receive said engine exhaust from said internal combustion engine, wherein said engine exhaust enters said contactor at a gas inlet port thereof and exits said contactor at a gas outlet port thereof;

(b) a plurality of spray nozzles aligned with the gas outlet port of said contactor, said plurality of spray nozzles spraying a lithium chloride solution into an interior portion of said contactor, said contactor facilitating a transfer of water vapor from said engine exhaust passing through said contactor to said lithium chloride solution wherein said lithium chloride solution contains lithium chloride and said water vapor transferred from said engine exhaust;

(c) a sump aligned with the gas inlet port of said contactor to receive said lithium chloride solution containing said water vapor from said contactor;

(d) a conductivity sensor located within said sump, said conductivity sensor measuring a concentration of the lithium chloride within said sump, wherein the concentration of the lithium chloride within said sump measured by said conductivity sensor is normally at a first concentration level of approximately two percent;

(e) a first pump having an inlet port connected to said sump and a discharge port;

(f) a filter connected to the discharge port of said first pump to receive said lithium chloride solution from said sump when the lithium chloride within said sump is at said first concentration level, said filter removing contaminants from said lithium chloride solution;

(g) a reverse osmosis unit connected to said filter to receive said desiccant from said filter and remove said water vapor from said lithium chloride solution, said water vapor exiting said reverse osmosis unit as drinking water; and (h) said reverse osmosis unit being connected to said plurality of nozzles to transfer said lithium chloride solution exiting said reverse osmosis unit to said spray nozzles which then spray the lithium chloride solution into the interior of said contactor, wherein the concentration of the lithium chloride contained within the lithium chloride solution exiting said reverse osmosis unit is normally at a second concentration level of approximately four percent;

(i) wherein said contactor comprises: includes:
  a gas inlet port for receiving said engine exhaust from said internal combustion engine and a gas outlet port, wherein said engine exhaust passes from the gas inlet port through an upper portion of said contactor to the gas outlet port;
  a liquid inlet port for receiving said lithium chloride solution and a liquid outlet port, wherein said lithium chloride solution passes from the liquid inlet port through a lower portion of said contactor to the liquid outlet port;
  a plurality of stainless steel mesh pads rotatably mounted within said contactor;
  a motor having a shaft which extends through said contactor, the shaft of said motor having said plurality of stainless steel mesh pads attached thereto, wherein said motor rotates said stainless steel mesh pads through the upper portion and the lower portion of said contactor;
  said stainless steel pads being coated with droplets of said lithium chloride solution when said stainless steel pads rotate through the lower portion of said contactor;
  said stainless steel pads recovering the water vapor from said engine exhaust when said stainless steel pads rotate through the upper portion of said contactor;
  said stainless steel pads releasing the lithium chloride solution containing said water vapor extracted from said engine exhaust when said stainless steel pads rotate through the lower portion of said contactor, said lithium chloride solution containing said water vapor exiting said contactor through the liquid outlet port of said contactor; and
  a plurality of wiping seals positioned within said contactor to separate a gas flow stream for said engine exhaust from a liquid flow stream for said lithium chloride solution.

4. An apparatus for recovering potable water from engine exhaust of an internal combustion engine comprising:

(a) a desiccant gas dryer having a contactor to receive said engine exhaust from said internal combustion engine, wherein said engine exhaust enters said contactor at a gas inlet port thereof and exits said contactor at a gas outlet port thereof;

(b) a plurality of spray nozzles aligned with the gas outlet port of said contactor, said plurality of spray nozzles spraying a lithium chloride solution into an interior portion of said contactor, said contactor facilitating a transfer of water vapor from said engine exhaust passing through said contactor to said lithium chloride solution wherein said lithium chloride solution contains lithium chloride and said water vapor transferred from said engine exhaust;

(c) a sump aligned with the gas inlet port of said contactor to receive said lithium chloride solution containing said water vapor from said contactor;

(d) a conductivity sensor located within said sump, said conductivity sensor measuring a concentration of the lithium chloride within said sump, wherein the concentration of the lithium chloride within said sump measured by said conductivity sensor is normally at a first concentration level of approximately two percent;

(e) a first pump having an inlet port connected to said sump and a discharge port;

(f) a filter connected to the discharge port of said first pump to receive said lithium chloride solution from said sump when the lithium chloride within said sump is at said first concentration level, said filter removing contaminants from said lithium chloride solution;

(g) a reverse osmosis unit connected to said filter to receive said desiccant from said filter and remove said water vapor from said lithium chloride solution, said water vapor exiting said reverse osmosis unit as drinking water;

(h) said reverse osmosis unit being connected to said plurality of nozzles to transfer said lithium chloride solution exiting said reverse osmosis unit to said spray nozzles which then spray the lithium chloride solution into the interior of said contactor, wherein the concentration of the lithium chloride contained within the lithium chloride solution exiting said reverse osmosis unit is normally at a second concentration level of approximately four percent;

(i) a normally closed bypass valve having an inlet port connected to the discharge port of said first pump and an outlet port connected to said spray nozzles which opens when a concentration level of the lithium chloride in said sump is above said first concentration level allowing said lithium chloride solution to bypass said reverse osmosis unit and flow directly to said spray nozzles;

(j) a second pump having an inlet port connected to said filter and a discharge port connected to a reverse osmosis membrane within said reverse osmosis unit, said second pump being activated when the concentration of the lithium chloride within said sump is measured at said first concentration level, wherein activating said second pump transfers said lithium chloride solution from said sump through said filter to the reverse osmosis membrane within said reverse osmosis unit; and (k) a digital computer connected to said conductivity sensor, said normally closed bypass valve and said second pump, said digital computer opening said normally closed bypass valve and activating said second pump in response to measurements by said conductivity sensor of the concentration level of said lithium chloride within said sump.

5. The apparatus of claim 4 wherein said contactor comprises:

(a) a gas inlet port for receiving said engine exhaust from said internal combustion engine and a gas outlet port, wherein said engine exhaust passes from the gas inlet port through an upper portion of said contactor to the gas outlet port;

(b) a liquid inlet port for receiving said lithium chloride solution and a liquid outlet port, wherein said lithium chloride solution passes from the liquid inlet port through a lower portion of said contactor to the liquid outlet port;

(c) a plurality of stainless steel mesh pads rotatably mounted within said contactor;

(d) a motor having a shaft which extends through said contactor, the shaft of said motor having said plurality of stainless steel mesh pads attached thereto, wherein said motor rotates said stainless steel mesh pads through the upper portion and the lower portion of said contactor;

(e) said stainless steel pads being coated with droplets of said lithium chloride solution when said stainless steel pads rotate through the lower portion of said contactor;

(f) said stainless steel pads recovering the water vapor from said engine exhaust when said stainless steel pads rotate through the upper portion of said contactor;

(g) said stainless steel pads releasing the lithium chloride solution containing said water vapor extracted from said engine exhaust when said stainless steel pads rotate through the lower portion of said contactor, said lithium chloride solution containing said water vapor exiting said contactor through the liquid outlet port of said contactor; and (h) a plurality of wiping seals positioned within said contactor to separate a gas flow stream for said engine exhaust from a liquid flow stream for said lithium chloride solution.

6. The apparatus of claim 4 wherein said contactor is a sparge box contactor comprising:

(a) an inlet port and an exit port through which said engine exhaust enters and exits said contactor;

(b) a check valve connected to the inlet port of said contactor, said check valve preventing liquid fluid flow into said internal combustion engine;

(c) a perforated plate positioned within said contactor below an upper surface for said lithium chloride solution within said contactor, wherein said engine exhaust forms into exhaust gas bubbles by passing through said perforated plate which substantially increases a rate for transfer of said water vapor from said engine exhaust to said lithium chloride solution; and (d) a plurality of demisters positioned within said contactor above the upper surface of said lithium chloride solution, wherein said demisters collect liquid droplets formed when the exhaust gas bubbles break the upper surface of the lithium chloride solution and coalesce said liquid droplets into substantially large liquid droplets which fall back into said lithium chloride solution.

* * * * *